United States Patent [19]

Smolinski

[11] Patent Number: 5,098,502
[45] Date of Patent: Mar. 24, 1992

[54] METHOD OF MAKING A SELF-ERASING, REUSABLE WRITING SURFACE ON PACKAGING STRUCTURE

[75] Inventor: Charles A. Smolinski, Marshall, Mich.

[73] Assignee: Kraft General Foods, Inc., Glenview, Ill.

[21] Appl. No.: 407,498

[22] Filed: Sep. 13, 1989

Related U.S. Application Data

[63] Continuation of Ser. No. 55,583, May 29, 1987, abandoned.

[51] Int. Cl.⁵ ............................................. B32B 7/14
[52] U.S. Cl. .................................. 156/291; 156/326; 273/240; 434/410
[58] Field of Search ...................... 434/410; 273/240; 156/291, 326; 428/343; 106/270

[56] References Cited

U.S. PATENT DOCUMENTS

| | | | |
|---|---|---|---|
| 1,543,430 | 6/1925 | Fischer | 434/410 |
| 2,663,095 | 12/1953 | Chase | 434/410 |
| 2,708,647 | 5/1955 | Walsh | 156/291 |
| 3,943,643 | 3/1976 | Fisher et al. | 434/410 |
| 4,051,609 | 10/1977 | Boursaw | 434/410 |
| 4,116,911 | 9/1978 | Miyahara et al. | 106/270 X |
| 4,375,909 | 3/1983 | Bos | 106/270 X |

FOREIGN PATENT DOCUMENTS

| | | | |
|---|---|---|---|
| 0175683 | 2/1922 | United Kingdom | 434/410 |
| 2055702 | 3/1981 | United Kingdom | 434/410 |

Primary Examiner—Michael W. Ball
Assistant Examiner—Mark A. Osele
Attorney, Agent, or Firm—Thomas A. Marcoux; Thomas R. Savoie; Linn I. Grim

[57] ABSTRACT

The present invention is concerned with a writing and drawing surface composed of a printed background color or design, a plastic adhesive media, an overlay film, an adhesive for affixing the perimeter of the film to the carton, and a lift tab pattern which allows the overlay film to be released from the packaging surface. The technique for manufacturing consists of applying the background color and film overlay adhesive to the packaging material concurrently with the desired graphics follows by the application of the plastic adhesive and overlay film.

6 Claims, No Drawings

METHOD OF MAKING A SELF-ERASING, REUSABLE WRITING SURFACE ON PACKAGING STRUCTURE

This is a continuation of application Ser. No. 055,583, filed May 29, 1987, now abandoned.

FIELD OF THE INVENTION

The present invention is concerned with a packaging structure incorporating a self-erasing, reusable writing and drawing surface. More particularly, the present invention is concerned with a packaging structure incorporating on at least one of its surfaces a self-erasing, reusable writing and drawing surface otherwise commonly known as a "magic slate" and a method for manufacturing same.

BACKGROUND OF THE INVENTION

Perpetual writing and drawing surfaces applicable to writing pads, slabs, blocks and books, sketching blocks, drawing books and the like from which surface the writing, drawings or other matters thereon can be instantaneously obliterated or caused to disappear without the use of a rubber or other erasing means has been known for years. Also, several attempts have been made throughout the years to improve these writing and drawing devices. For instance, U.S. Pat. No. 1,455,579 by Evans discloses a writing or drawing surface consisting of a colored base coated or impregnated with or consisting of a plastic substance or vehicle, and a writing and drawing surface proper consisting of transparent or semi-transparent tissue or other paper, silk, skin or like materials. The plastic substance or vehicle and the surface proper being impregnated are coated or treated with grease or oil.

Typically, in writing and drawing devices, a sheet of fabric or the like is arranged above a dark-colored slightly adhesive bottom layer consisting of a wax material and in which the writing and drawing is produced by pressing the fabric sheet against the wax bottom layer so that the pressurized area adheres to the bottom layer causing a writing or drawing to appear on the bottom layer. To obliterate the writing or drawing, the impressed sheet of fabric is lifted from the bottom layer.

Constant lifting and impressing the top sheet against the waxed bottom layer over time generally result is destruction of the top sheet which is usually thinner and more fragile. An attempt to alleviate this problem is disclosed in U.S. Pat. No. 1,512,827 by Deutsch which teaches an obliterating device in the form of a strip, string, or wire extruding across the writing surface between the adhesive bottom layer and the sheeted top layer which when moved, separates the adhering part from the adhesive part. Further attempts of improvement is disclosed in U.S. Pat. No. 1,543,430 by Fischer which discloses means for holding the upper and lower member together so that they will be held smooth and flat to prevent wrinkling or injury to the member. U.S. Pat. No. 1,555,642 discloses a third protective sheet or layer which consists of a comparatively strong material which further protects the second sheet and the wax coat. U.S. Pat. No. 1,568,548 by Edelson protect the overlying paper or sheet by covering the sheet with a thin transparent sheet of cellulose material. Lastly, U.S. Pat. No. 3,321,849 by Langbart describe a "magic slate" similar to the ones disclosed above except that Langbart discloses a slider extending the width of the slate and extending between the semi-transparent sheet of material and the adhesive layer. Movement of the slider from one end of the slate to the other causes the semi-transparent sheet and adhesive layer to separate thereby removing all writing or drawing.

The use of packaging premiums as a sales promotional device has been widespread. However, in package foods such as cereals and the like, the premiums utilized are generally in the form of "drop-ins". Complete assurance that each package contains a premium such as "drop-ins" have been less than 100% reliable. Further the promotional cost up-charge for handling "drop-ins" premiums has risen to the point of becoming less economically feasible. Hence, the need to come up with new promotional devices has been constantly ongoing, and the present invention teaches a new packaging structure and a process for preparing same which totally eliminates the need to use "drop-ins" premiums for promotional advantage.

None of the above references, however, discloses a reusable writing and drawing surface to be incorporated into packaging media such as folding cartons and thus, be used as a device to promote product sales.

It is, therefore, an object of the present invention to produce a reusable writing and drawing surface on a packaging media which is directly visible to the purchaser.

Another object of the present invention is to provide a reusable writing and drawing surface of increased size and value wherein said writing and drawing surface is not in the form of "drop-ins".

A further object of the present invention is to provide a reusable writing and drawing surface wherein the consumer utilizes said writing and drawing surface while on the container without impairing the container's carrying and/or protective functions.

Still, a further object of the present invention is a process for incorporating a writing and drawing surface into a packaging media such as a folding carton or other containers having at least one relatively rigid surface.

Further object of the invention will become more apparent from the following detailed description.

SUMMARY OF THE INVENTION

The present invention is concerned with a packaging structure incorporated on at least one of its surfaces, a self-erasable, reusable writing and drawing surface said surface comprising a printed colored background, a pressure sensitive adhesive media annexed the printed colored background, said adhesive adapted to receive impressions from a drawing or writing instrument, a film overlaying the adhesive media, a second adhesive for affixing the perimeter of the film to the packaging structure; and, means for releasing the overlay film from the packaging surface. Further, the present invention is concerned with a process for preparing a packaging structure comprising, printing a paperboard web with a desired background color and graphics; applying a pressure sensitive adhesive immediately about the area overlapping the background color; applying the overlay film to the surface containing the pressure sensitive adhesive with a second adhesive for affixing the perimeter of the film to the pressure sensitive adhesive under the application of pressure; and, folding the paperboard into a carton for use.

DETAILED DESCRIPTION

The present invention is concerned with the incorporation of a "magic slate" type drawing surface into packaging media to be used as a sales promotional device. This invention utilizes a single overlay film construction rather than a dual overlay system found in most commercial "magic slate", and may be manufactured by a standard window applying machine.

In the present invention, a packaging structure incorporated on at least one of its surfaces a self-erasable, reusable writing and drawing surface said surface comprising a printed colored background, a pressure sensitive adhesive media annexed the printed colored background said adhesive adopted to receive impressions from a drawing or writing instrument, a film overlaying the adhesive media; a second adhesive for affixing the perimeter of the film to the packaging structure; and, means for releasing the overlay film from the packaging surface is produced.

According to the present invention, an adhesive material such as a wax or like adhesive materials which exhibits flow in a molten or plastic state and adheres to the ink coating is applied directly over the background color. An overlay sheet or film is affixed at its perimeter directly over the plastic-flowing adhesive coating.

The film overlay should be of sufficient opacity to allow for preprinting. The degree of opacity should be such that it reflects light except when the film is in intimate contact with the plastic adhesive. Further, the film overlay must be sufficiently durable so as to resist scuffing, stretching and wrinkling. Popular "magic slates" are designed based on two overlay films. A durable, clear, outer film which resists distortion, and a flexible, translucent inner film which functions as the drawing surface reception.

The single film overlay of the present invention is securely attached to the carton to resist damage during handling, packaging and shipping operations. The bond, however, is such that the film can be removed from the container surface without damage to the container or film. This type of bond between the film and the container is produced as a result of the inherent nature of the adhesive. A second adhesive which creates a non-destructive type bond is applied about the perimeter of the drawing board, with the exception of the top. At the top of the film is applied a destructive adhesive which is necessary to hold the film overlay in place during use. This non-destructive bond presents the total removal of the film from the container with the exception of the top portion, thereby allowing for continuous utilization of the writing and erasing features of this invention.

The writing surface taught by the present invention is applicable only to those packaging structures having at least one, relatively flat and rigid surface. A typical example of such a suitable container is a paperboard carton as used to distribute cereal products. Dark colors applied to one surface of this carton serves as a background color. Numerous colors and printed patterns can be envisioned for drawing board designs.

The present invention further teaches a process for preparing a packaging structure incorporated on at least one of its surfaces a self-erasable, reusable writing and drawing surface comprising the steps of: printing a paperboard web with desired graphics and background color, applying a pressure sensitive adhesive immediately about the area overlapping the background color, applying an overlay film to the surface containing the pressure sensitive adhesive with a second adhesive for affixing the perimeter of the film to the packaging structure under the application of pressure, and folding the paperboard into a carton for use.

The on-carton writing surface is produced on conventional carton manufacturing equipment. First, the paperboard web is printed with the desired carton graphics. During the graphics application a background color is applied to the web in a desired area of the carton. A typical configuration of a background color is a rectangle centered on the back panel of the carton. However, the background color may be of a variety of configurations and applied at any desired area on the carton.

Immediately about the perimeter of the background color and overlaying the background color, a pressure sensitive adhesive or plastic adhesive is deposited. The properties of this adhesive are such that it can be applied to the web in the form of a coating, dries to a sufficiently hard film so as not to cause blocking in the rewound presented roll, and bonds the overlay film to the container surface under the application of pressure.

The pressure sensitive adhesive is applied directly over and coextensive with the background color. A suitable adhesive is a blend of paraffin and microcrystalline wax formulated such that it flows slightly under the pressure of the writing stylus. The means for the application of the plastic adhesive consists of a transfer roll which rotates in the bath of molten wax and is metered. A second applicator roll consisting of rubber pads having the shape of the drawing board is attached to a steel base which is in close proximity to both the transfer roll and the carton. Wax is transferred from the bath to the transfer roll to the applicator roll to the carton. The amount of wax transferred from the bath to the carton is determined by the surface preparation of the transfer roll (smooth or etched), the distance between the rolls, the distance from the rolls to the carton and the viscosity of the wax blend.

The smoothness of the wax film and its penetration in the carton is controlled by thermal conditioning of the carton prior to the overlay film application using radiant type heaters. It should be noted that in the present invention any base materials and additives other than waxes that exhibit the appropriate properties may function as the plastic adhesive.

The film overlay is generally applied to the wax coated web in a separate operation. The film applicator first removes the overlay film from a roll, cuts it to the designated length and deposits it over the plastic wax coating. It is preferred that the film be applied to the coating while the coating is molten or tacky. The plastic adhesive coating temporarily bonds the overlay film to the carton and prevents the use of drawing board until the film overlay is lifted. In the same operation, pressure controlled rollers bond the pressure sensitive areas of the film and carton together. The overlay film is dimensionally coextensive with or slightly smaller than the area of the pressure sealing media so as to ensure that the outer edges of the film are secured to the carton.

The film overlay is applied to the surface containing the pressure sensitive adhesive with a second adhesive necessary for affixing the perimeter of the film to the pressure sensitive adhesive. The second adhesive is applied to the perimeter of the overlaying film prior to contact with the pressure sensitive adhesive with the exception of the top. At the top of the film is applied a destruction adhesive which holds the top portion permanently in contact with the pressure sensitive adhesive thereby allowing for continuous utilization of the writing and erasing features of the invention. The pressure sensitive adhesive applied to the carton and the adhesive applied about the perimeter of the film are such that they will only adhere to themselves.

The finished package is filled, shipped and merchandized in the customary manner. The consumer purchases the package and activates the drawing board by grasping an edge of the overlay film and lifting the film free from the carton surface. A lift tab feature incorporated into the carton design assists the consumer in the activating process by providing access to a loose edge of film. One edge of the film remains securely attached to the container. Using a stylus such as a fingernail, the end of a pen, a spoon, a device packaged within the container or some other blunt instrument, the consumer applies pressure to the overlay sheet in a narrow line and bring the sheet into contact with the plastic adhesive. The adhesive deforms and flows into the surface aberations that previously reflected the incandescent light causing the surface to appear translucent. Light impinging on those areas of the overlay film in contact with the plastic adhesive is not reflected but transmitted through the film into the adhesive. These areas appear dark and thus permit writing and drawing. Markings on the writing surface are removed by again grasping an edge of the overlay film, separating the film from the adhesive and rupturing any areas of contact.

What is claimed is:

1. A process for preparing a packaging structure which has incorporated on at least one of its surfaces, a self erasing, reusable, writing and drawing surface comprising the steps of:
   a) printing a paperboard web with desired graphics and background color;
   b) applying a pressure sensitive adhesive immediately about the area overlapping the background color;
   c) applying an overlaying film to the surface containing the pressure sensitive adhesive with a second adhesive for affixing the entire perimeter except the top of the film to the pressure sensitive adhesive to form a non-destructive bond while simultaneously applying pressure throughout the entire surface area of the film to prevent use as a writing and drawing surface prior to initially loosening the overlaying film;
   d) applying a destructive adhesive at the top of the film to hold the overlaying film in place during use; and,
   e) folding the paperboard into a carton for use.

2. A process according to claim 1 wherein one of the packaging surfaces is rigid.

3. A process according to claim 1 wherein the foldable carton is for packaging of food product.

4. A process according to claim 3 wherein the food product is a cereal product.

5. A process according to claim 1 wherein the pressure sensitive adhesive is a mixture of paraffin wax and microcrystalline cellulose.

6. A process according to claim 1 wherein the overlaying film is released from the pressure sensitive adhesive by means of a lift tab.

* * * * *